(12) United States Patent
Knabl et al.

(10) Patent No.: US 10,317,504 B1
(45) Date of Patent: Jun. 11, 2019

(54) RFID ORIENTATION DETECTION

(71) Applicant: NXP B.V., Eindhoven (NL)

(72) Inventors: David Knabl, Hitzendorf (AT); Harald Helfried Robert, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/838,570

(22) Filed: Dec. 12, 2017

(51) Int. Cl.
*G01S 3/14* (2006.01)
*H01Q 1/22* (2006.01)
(Continued)

(52) U.S. Cl.
CPC ............ *G01S 3/14* (2013.01); *G01S 13/751* (2013.01); *G01S 13/765* (2013.01); *H01Q 1/2216* (2013.01); *H01Q 1/2225* (2013.01)

(58) Field of Classification Search
CPC ............ G07F 17/322; G07F 17/3237; G07F 17/3225; G07F 17/3248; G07F 17/329; G07F 17/3293; A63F 1/06; A63F 2003/00164; A63F 2009/2429; A63F 2009/2489; A63F 3/00157; A63F 9/24; A63F 1/18; G06K 19/0723; G06K 7/0008; G06K 7/10079; G06K 7/10089; G06K 7/10356; G06K 7/10386; G06K 19/07796; G06K 7/10009; G06K 7/10217; G06K 7/10297; G06K 7/10366; G06K 7/10762; G06Q 20/02; G06Q 20/20; G06Q 20/32; G06Q 20/3223; G06Q 20/382; G06Q 20/385; G06Q 20/40; G06Q 20/40975; G06Q 10/0875; G06Q 20/10; G06Q 20/18; G06Q 20/204; G06Q 20/3278; G06Q 20/342; G06Q 20/352; G06Q 20/356; G06Q 30/0215; G06Q 50/34; H01Q 15/0086; H01Q 1/2216; H01Q 1/3291; H04L 2209/56; H04L 2209/80; H04L 9/321;
(Continued)

(56) References Cited

U.S. PATENT DOCUMENTS

2006/0279458 A1* 12/2006 Mohamadi ........... H01Q 1/2216
342/368
2009/0002168 A1* 1/2009 Oozawa ............... G06K 7/0008
340/572.1
(Continued)

FOREIGN PATENT DOCUMENTS

EP 1696365 A2 8/2006
JP 2006277669 A 10/2006

*Primary Examiner* — Daniel Previl
(74) *Attorney, Agent, or Firm* — Senaida B. San Miguel

(57) ABSTRACT

Embodiments of a radio frequency identification (RFID) reader are provided herein, which include an RFID interrogator; a detection surface for a game piece, the detection surface comprising a plurality of reader antennas in a geometric arrangement; and antenna switching circuitry coupled between the RFID interrogator and the plurality of reader antennas; wherein the antenna switching circuitry is configured to consecutively activate each one of the plurality of reader antennas for at least a detection time window, and wherein the RFID interrogator is configured to: for each reader antenna, detect whether a response signal is received by the reader antenna during the detection time window, and determine a geometric orientation of the game piece based on a subset of reader antennas that received the response signal.

18 Claims, 8 Drawing Sheets

(51) Int. Cl.
 *G01S 13/75* (2006.01)
 *G01S 13/76* (2006.01)

(58) Field of Classification Search
 CPC ...... H04L 9/3234; H04L 9/3271; A23L 3/001;
 A23L 3/003; B60N 2002/0268; B60N
 2002/0272; B60N 2/002; B60N 2/0232;
 B60N 2/0244; B60N 2/0248; B60N
 2/0252; B60N 2/0276; B60N 2/28; B60R
 16/037; B60R 2001/1223; B60R
 2001/1253; B60R 2021/0027; B60R
 2021/01315; B60R 2021/23153; B60R
 2021/26094; B60R 2021/2765; B60R
 2022/208; B60R 2022/288; B60R
 2022/4685; B60R 2022/4825; B60R
 2025/1016; B60R 21/013; B60R 21/0134;
 B60R 21/0136; B60R 21/01516; B60R
 21/01526; B60R 21/0153; B60R
 21/01532; B60R 21/01534; B60R
 21/01536; B60R 21/01538; B60R
 21/01542; B60R 21/01544; B60R
 21/01546; B60R 21/01548; B60R
 21/01552; B60R 21/01554; B60R 21/203;
 B60R 21/21656; B60R 21/276; B60R
 22/20; B60R 22/201; B60R 25/25; B60R
 25/252; B60R 25/255; B60R 25/257;
 E05Y 2900/55; G01S 13/04; G01S 15/04;
 G01S 15/06; G01S 15/42; G01S 15/87;
 G01S 15/88; G01S 17/026; G01S 17/88;
 G01S 17/89; G01S 7/417; G01S 7/4802;
 G01S 7/539; G06F 3/0219; G06F 3/0233;
 G06F 3/0237; G06F 3/0238; G06F 7/582;
 G07C 15/006; G07C 5/008; G07C
 5/0808; G08B 13/2462; G08B 13/2471;
 G08B 13/248; G08B 13/2485; G08B
 21/0286; G09F 2003/0283; G09F 3/02;
 G10K 2210/1282; G10K 2210/3219;
 H04W 4/14
 USPC ......... 340/572.1–572.9, 573.1, 568.1, 539.1,
 340/10.1
 See application file for complete search history.

(56) References Cited

U.S. PATENT DOCUMENTS

| | | | | |
|---|---|---|---|---|
| 2012/0252564 | A1* | 10/2012 | Moore | G07F 17/322 |
| | | | | 463/25 |
| 2013/0043981 | A1* | 2/2013 | Wang | G06K 7/10356 |
| | | | | 340/10.1 |
| 2013/0054474 | A1* | 2/2013 | Yeager | G06Q 20/3223 |
| | | | | 705/71 |
| 2016/0004894 | A1 | 1/2016 | Tanikawa et al. | |
| 2016/0012465 | A1* | 1/2016 | Sharp | G06Q 20/18 |
| | | | | 705/14.17 |

* cited by examiner

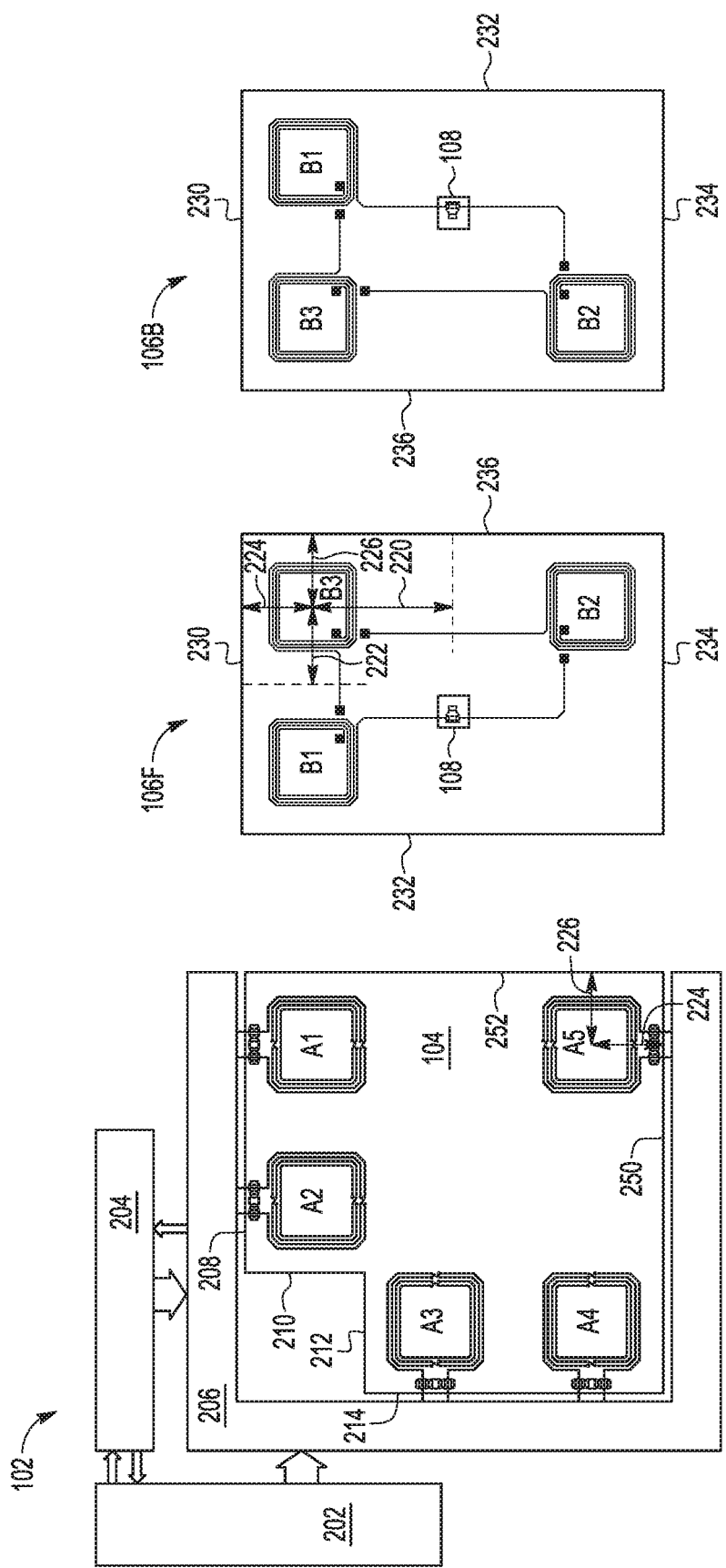

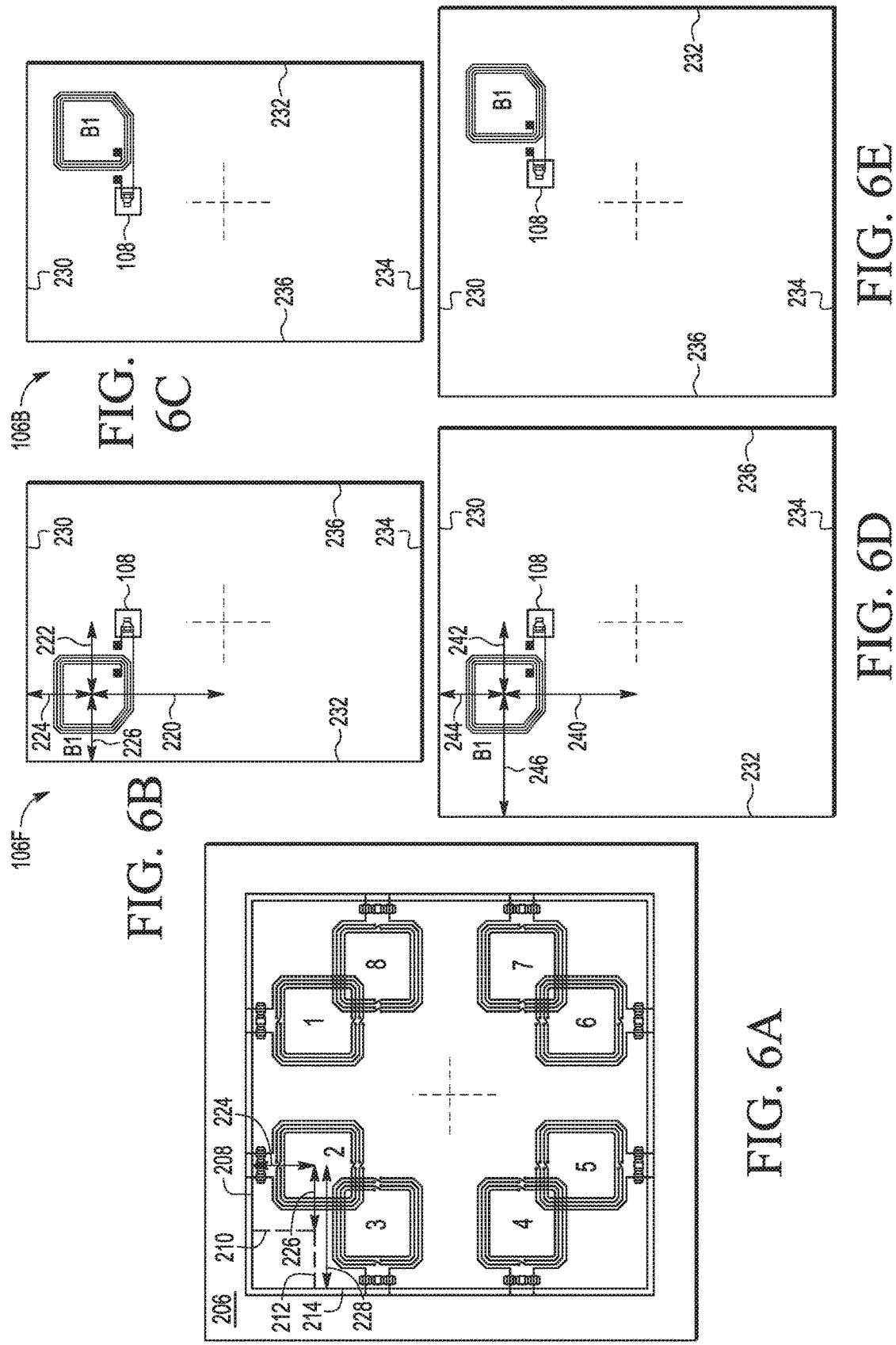

RFID ORIENTATION DETECTION

BACKGROUND

Field

This disclosure relates generally to radio frequency identification (RFID) systems, and more specifically, to orientation detection of an object in an RFID system.

Related Art

Radio frequency identification (RFID) systems are used in a variety of applications, such as tracking objects or products in a supply chain or product delivery chain. A conventional RFID system includes a tag attached to an object and a reader. The reader includes a transmitter for transmitting an interrogation signal to the tag and a receiver for receiving a response signal from the tag. The tag stores identification data for the object, and includes the identification data in its response signal, allowing the object to be identified by the reader.

BRIEF DESCRIPTION OF THE DRAWINGS

The present invention may be better understood, and its numerous objects, features, and advantages made apparent to those skilled in the art by referencing the accompanying drawings.

FIG. 4A is a block diagram depicting another example RFID reader and FIGS. 4B and 4C are block diagrams depicting another example game piece of an RFID system according to some embodiments of the present disclosure.

FIG. 6A is a block diagram depicting another example RFID reader and FIG. 6B-6E are block diagrams depicting additional example game pieces of an RFID system according to some embodiments of the present disclosure.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

Figure 1:
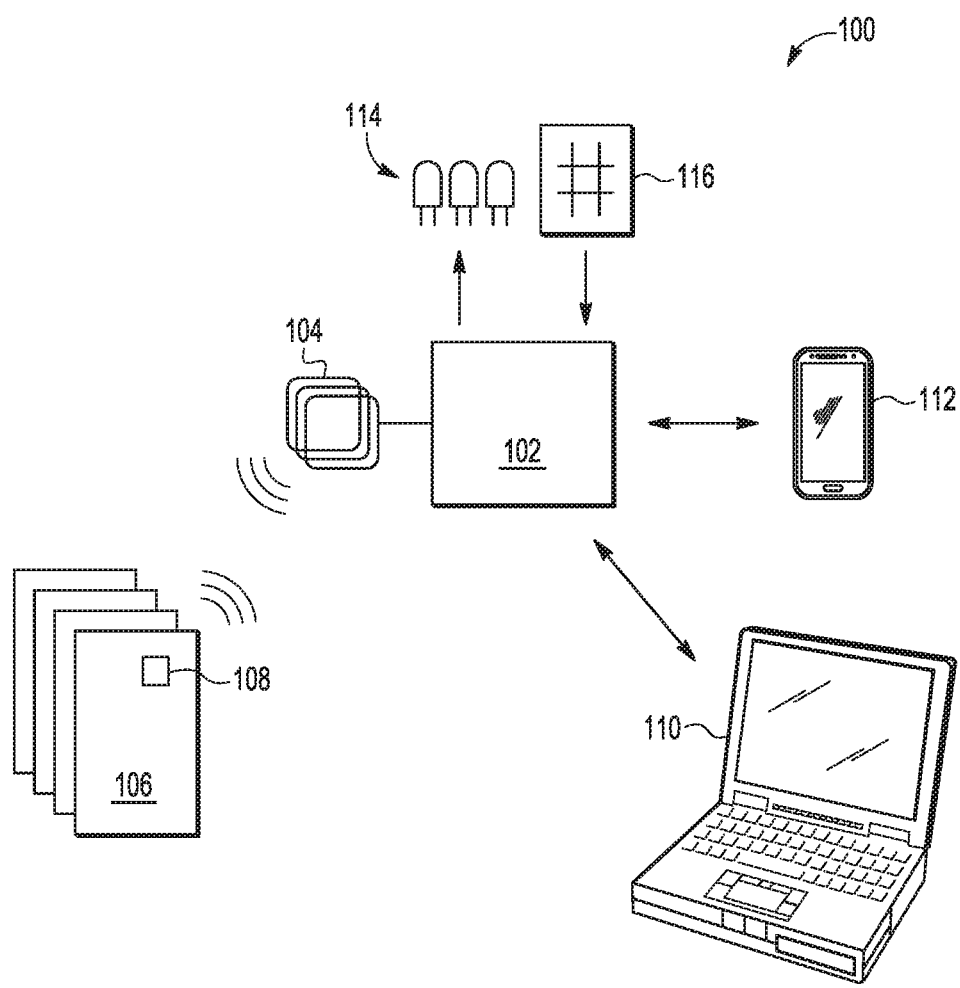
FIG. 1 is a block diagram depicting an example radio frequency identification (RFID) system according to some embodiments of the present disclosure.

The following sets forth a detailed description of various embodiments intended to be illustrative of the invention and should not be taken to be limiting.

Overview

Radio frequency identification (RFID) systems are used in a variety of applications. For example, a conventional RFID system may be used to track game pieces in a board game or card game, such as by attaching a tag to a game piece. A conventional tag typically includes an RFID integrated circuit (or RFID chip) connected to a tag antenna, and a conventional reader typically includes an interrogator connected to a reader antenna. The RFID chip and the interrogator each include a transceiver (which includes both a transmitter and a receiver) for modulating and demodulating radio frequency (RF) signals exchanged between the RFID chip and the interrogator. The interrogator drives an interrogation signal on the reader antenna, which radiates the interrogation signal within a defined area around the reader antenna, also referred to as an interrogation zone. When the tag antenna is within the interrogation zone of the reader antenna, the interrogation signal is received by the tag antenna and provided to the RFID chip. The RFID chip is configured to store identification data, and responds to the interrogation signal by driving a response signal that includes the identification data on the tag antenna. While this approach allows each game piece to be individually identified by the reader, such a conventional RFID system is not capable of detecting an orientation of the game piece. For example, the game piece may be a card that may be in a face-up or face-down orientation, or may be rotated in the left or right direction.

The present disclosure provides an RFID system that includes an RFID reader coupled to a plurality of antennas arranged in a geometric arrangement on or within a detection surface. The RFID reader is configured to detect an orientation of a game piece placed on the detection surface, where the game piece includes one or more tag antennas. Based on the arrangement of the one or more tag antennas on the game piece, at least one tag antenna is aligned with a respective reader antenna, which indicates a geometric orientation of the game piece. Each geometric orientation detectable by the RFID reader is associated with a different subset of reader antennas that are aligned with a respective tag antenna. The RFID reader is configured to determine whether a reader antenna is aligned with a respective tag antenna by consecutively activating each reader antenna (e.g., enable one antenna at a time in a consecutive order) and detecting whether a response signal is received on the reader antenna during a detection time window (e.g., checking each antenna for a response signal). For example, this orientation detection process may be implemented by the RFID reader being configured to enable a present reader antenna to transmit the interrogation signal, keep the present reader antenna enabled for a programmable detection time window during which a response signal may be received, and disable the present antenna at the expiration of the programmable detection time window. The RFID reader is configured to select the next antenna in the consecutive order and repeat this orientation detection process until all antennas have been checked.

Example Embodiments

FIG. 1 is a block diagram depicting an example radio frequency identification (RFID) system 100 according to the present disclosure. RFID system 100 includes an RFID reader 102 coupled to a detection surface 104 that includes a plurality of reader antennas, which are located within the detection surface 104 in a geometric arrangement. RFID system 100 also includes a plurality of game pieces 106, each of which includes an RFID integrated circuit (or RFID chip) 108 coupled to one or more tag antennas. The one or more tag antennas are also located on or within each game piece 108 in another geometric arrangement. RFID reader 102 is configured to detect the orientation of a game piece 106 placed on or near the detection surface 104 based on the alignment pattern of the tag antennas to the reader antennas, where alignment pattern includes a subset of reader antennas that receive a response signal, as further described below. In the embodiments discussed herein, the reader and tag antennas are shown as loop antennas that implement a square shape (e.g., with rounded corners). However, the reader and tag antennas may implement other shapes in other embodiments, such as circular shapes, elliptical shapes, triangular shapes, rectangular shapes, and other polygonal shapes suitable for RFID communication. Examples of game pieces 106 include but are not limited to cards, tiles, dice, coins, chips, and the like. The geometric arrangements of the reader antennas and tag antennas are also further discussed below.

RFID chip 108 implements memory (e.g., long term storage such as non-volatile memory such as flash memory or the like) that stores identification data. Each game piece 106 may be uniquely identified in the RFID system 100 by a unique identification code (UID code) stored in memory by its respective RFID chip 108. RFID chip 108 also implements a radio frequency (RF) front-end block, which includes circuitry that implements transceiver functionality for bidirectional communication between RFID chip 108 and RFID reader 102. The RF front-end block implements front end components of a transceiver (which may include both a transmitter circuit and a receiver circuit) for transmitting and receiving RF signals (e.g., receiving interrogator signals and transmitting response signals). The front-end components may include but are not limited to a transmitter power amplifier, a receiver low noise amplifier, one or more baluns, one or more filters, a circulator or other coupling device to the antenna, impedance matching elements, an oscillator, a phase locked loop, a resonance and bandwidth circuit (e.g., one or more resistors and capacitors), and other appropriate front-end elements. In some embodiments, RFID chip 108 is coupled to all of the one or more tag antennas on a respective game piece 106. In other embodiments, a separate RFID chip 108 is coupled to each tag antenna on a respective game piece 106. However, it is preferred to have a single RFID chip 108 coupled to all of the tag antennas on a game piece 106 in order to reduce cost of the game pieces 106.

RFID reader 102 includes interrogator functionality that also implements an RF front-end block for bidirectional communication, such as for transmitting and receiving RF signals (e.g., transmitting interrogator signals and receiving response signals). RFID reader 102 also includes switching circuitry coupled between the interrogator functionality and the plurality of reader antennas, and logic functionality for implementing an orientation detection algorithm that consecutively activates each of the reader antennas in a consecutive order to detect an alignment pattern of the game piece 106, as further discussed below. Either the logic functionality or the interrogator functionality may also include a digital signal processing (DSP) block, which may be configured to extract the identification data (e.g., UID code) from a received response signal. The interrogator functionality and logic functionality are implemented, at least in part, as circuitry.

RFID reader 102 and RFID chip 108 are configured to communicate wirelessly by exchanging RF signals according to a wireless communication protocol, such as an RFID protocol based on the ISO/IEC 18000 family of standards. The teachings of the present disclosure may also be applicable to other wireless communication protocols, examples of which include but are not limited to near field communication (NFC) protocols such as protocols based on the ISO/IEC 14443 family of standards, wireless network protocols based on IEEE 802.11 or IEEE 802.15 families of standards, and the like. RF signals have a frequency that generally falls within a range of 20 kHz to 300 GHz. In some embodiments, the RFID system 100 may use RF signals having frequencies that are generally centered around 13.56 MHz (e.g., using a 13.56 MHz carrier signal). In other embodiments, the RFID system 100 may use RF signals having frequencies that generally fall within a range of 120 kHz to 10 GHz, or in a range of 856 to 960 MHz, or in a range of 125 to 135 kHz.

In some embodiments, RFID reader 102 is configured to communicate with a host application on a computing device such as a laptop computer 110 or mobile device 112. A computing device includes a processor and associated memory that is configured to execute a host application. Examples of computing devices include, but are not limited to, mobile phones, smartphones, desktop computers, laptop computers, personal data accessories (PDAs), game consoles, automotive and other embedded systems, other wireless devices, and the like. In some embodiments, the host application may implement a game, such as a board game or card game. The host application may implement game rules and a user interface for receiving user input, for displaying results of the orientation detection performed by the RFID reader 102, for displaying game results based on the orientation detection, and the like.

In other embodiments, RFID reader 102 is configured as a standalone device or fully integrated device, where RFID reader 102 also implements the host application. For example, RFID reader 102 may a microcontroller that includes a processor and memory to execute the host application, where the host application is communicatively coupled to the logic functionality that implements the orientation detection algorithm. Additionally, RFID reader 102 also includes a display device 114 and an input device 116 in such embodiments. Examples of display device 114 include but are not limited to light emitting diode (LED) display, a liquid crystal display (LCD), and other suitable types of displays. Examples of input device 116 include but are not limited to a keypad, a keyboard, and other suitable types of input devices. RFID reader 102 may also include additional circuitry or components in other embodiments, such as a light sensor for detecting whether a game piece has been placed on the detection surface 104.

Figures 2A, 2B, 2C:
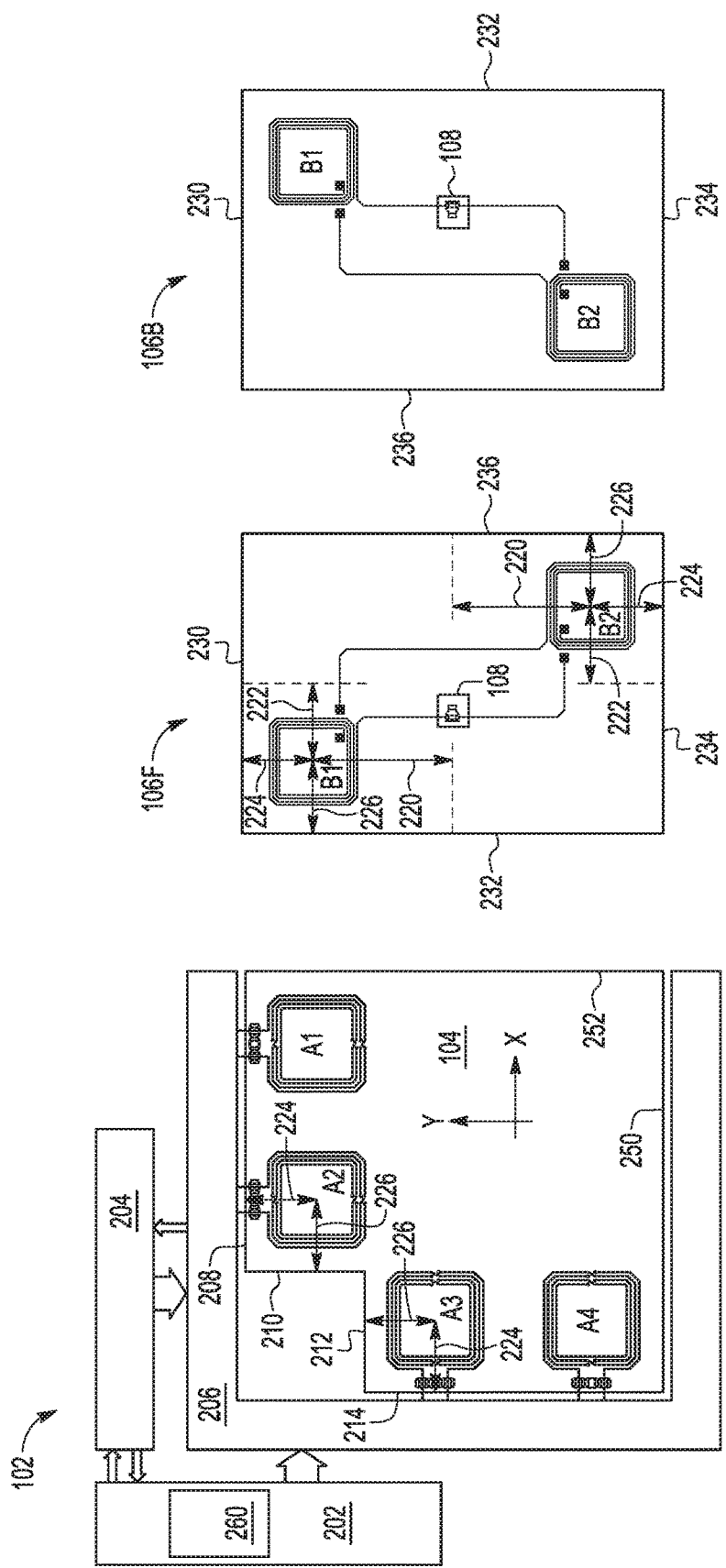
FIG. 2A is a block diagram depicting an example RFID reader and FIGS. 2B and 2C are block diagrams depicting an example game piece of an RFID system according to some embodiments of the present disclosure.

FIG. 2A shows an example RFID reader 102 of an RFID system 100. In the embodiment shown, RFID reader 102 includes logic functionality 202, interrogator functionality 204, antenna switching circuitry 206, and a detection surface 104 that includes a plurality of reader antennas A1-AN, where N is an integer that is greater than one. Logic functionality 202 may be implemented as control logic circuitry on an integrated circuit or chip, which may be part of a microcontroller or similar device. Interrogation functionality 204 may be implemented as active circuitry (including an RF front-end block) on an RFID integrated circuit or chip, which may be included as part of the microcontroller in some embodiments or may be a separate device from the microcontroller in other embodiments. For simplicity's sake, logic functionality 202 is referred to herein as logic 202, antenna switching circuitry 206 is referred to herein as switching circuitry 206, and interrogator functionality 204 is referred to herein as an interrogator 204.

Switching circuitry 206 implements a plurality of switches, where each switch is coupled to a respective reader antenna. Each switch of switching circuitry 206 is configured to receive a control signal from logic 202 (shown as the arrow from logic 202 to switching circuitry 206), which enables or disables the respective reader antenna. The switches may be implemented using transistors, such as p-channel or n-channel transistors, or other suitable type of switching device. In some embodiments, switching circuitry 206 includes additional components such as matching components, resonance and bandwidth components, and the like. Switching circuitry 206 is further discussed below in connection with FIGS. 7 and 8.

Interrogator 204 includes an RF front-end block (described in connection with FIG. 1), which is coupled to antenna switching circuitry 206 and is configured to provide an RF signal such as an interrogator signal to switching circuitry 206, and receive an RF signal such as a response signal from switching circuitry 206. Switching circuitry 206 is configured to route the interrogator signal from an output of the RF front-end block (e.g., power amplifier) to one of the plurality of reader antennas and route the response signal from one of the plurality of reader antennas to an input of the RF front-end block (e.g., low noise amplifier), according to the control signals received from logic 202.

Logic 202 is communicatively coupled to interrogator 204 (as indicated by arrows in both directions between logic 202 and interrogator 204). Logic 202 is configured to implement an orientation detection algorithm that controls both the interrogator 204 and the switching circuitry 206 to determine an alignment pattern of one or more tag antennas to one or more reader antennas on the detection surface 104. In some embodiments, the orientation detection algorithm is triggered in response to a game piece 106 being placed on the detection surface 104. For example, logic 202 may receive a signal from a light sensor or photoelectric sensor on the detection surface 104 that indicates whether light is received on the sensor (e.g., no game piece detected) or whether light is blocked from the sensor (e.g., a game piece is detected). In other embodiments, logic 202 may receive a user input signal, such as a button press, to trigger the orientation detection algorithm.

Logic 202 is configured to implement the orientation detection algorithm by outputting control signals to switching circuitry 206 to activate one reader antenna at a time and check whether each reader antenna is magnetically coupled with a tag antenna (e.g., by detecting whether the reader antenna has received a response signal). The reader antennas are arranged on or within the detection surface 104 in such a way that at least one reader antenna couples with at least one tag antenna in each detectable orientation of the game piece 106. A minimum or sufficient magnetic coupling is achieved for communication when a tag antenna generally falls within an outer boundary of an interrogation zone or space around a reader antenna, where coupling in general is dependent on the geometrics and distance between the tag antennas to reader antennas. The reader antennas may be tuned to an operating frequency using a resonance circuit, as further discussed below in FIGS. 7 and 8. The reader antennas are each assigned a respective integer order number, such as from 1 to N. Logic 202 includes a counter [i] that is initialized to 1 when the orientation detection algorithm is triggered. Logic 202 selects the reader antenna that is associated with the present counter [i] as the present reader antenna. Logic 202 is configured to output control signals that enable the present reader antenna and disable the remaining reader antennas.

Concurrently, logic 202 is configured to trigger interrogator 204 (e.g., send a command signal to interrogator 204) to output an interrogator signal to switching circuitry 206, which routes the interrogator signal to the present reader antenna that is now enabled or activated. After the interrogator signal is transmitted on the present reader antenna (e.g., radiated within an interrogation zone of the present reader antenna), logic 202 triggers a detection time window, which may be a nominal period of time during which a response is expected to be received if a tag antenna is magnetically coupled to the present reader antenna. The tag antenna need not be strictly aligned with the reader antenna, but should fall substantially within the interrogation zone to achieve sufficient magnetic coupling for successful exchange of the interrogation and response signals. The detection time window may be on the order of microseconds (e.g., 10-50 us) in some embodiments, depending on how quickly the RF front-end block (e.g., the receiver) of the interrogator 204 recognizes or detects the response signal as a valid signal. The detection time window may be programmable, such as by setting a timer or down counter to a value that corresponds to the desired period of time.

During the detection time window, interrogator 204 waits for a response signal to be received on the present reader antenna. If interrogator 204 detects that a response signal is received before the detection time window has expired, interrogator 204 relays this information to logic 202. In some embodiments, logic 202 includes temporary or transitory memory 260 to track which reader antennas have received a response signal, which may be implemented as one or more buffers or registers. The buffer may be cleared (e.g., initialized to all zeros) when the orientation detection algorithm is triggered. In some embodiments, logic 202 stores the present counter [i] (which is associated with the present reader antenna) in the buffer in response to receiving an indication signal from interrogator 204 that a signal has been received.

In other embodiments, each reader antenna is associated with a respective buffer in memory 260 for storing a flag bit, where logic 202 sets a flag (e.g., 1) in the buffer associated with the present reader antenna in response to receiving an indication signal from interrogator 204 that a signal has been received. The buffers may be cleared (e.g., initialized to zero) when the orientation detection algorithm is triggered.

In embodiments where interrogator 204 includes DSP circuitry, interrogator 204 may also extract and relay the UID code to logic 202 as part of the indication signal. In embodiments where logic 202 includes DSP circuitry, interrogator 204 may provide the response signal to logic 202, which may then extract the UID code. In some embodiments, the response signal itself may be the indication signal to logic 202 that a signal was received.

When the detection time window expires, logic 202 disables the present reader antenna. The counter is incremented by one [i++] and logic 202 selects a next reader antenna associated with the updated counter, which becomes the present reader antenna. Logic 202 then activates the present reader antenna and checks whether the (new) present reader antenna has received a response signal, as described above. In this manner, logic 202 iterates through the reader antennas in consecutive order, checking each reader antenna one at a time.

Once all reader antennas have been checked, logic 202 is configured to compare the present subset of reader antennas that have received the response signal with pre-programmed or known subsets of reader antennas, where each known subset includes a unique combination of the reader antennas and is associated a respective orientation of the game piece. When the present subset is matched with a known subset, the orientation associated with the known subset is identified as the present orientation of the game piece on the detection surface 104. In some embodiments, the present orientation is provided to a host application, which may be implemented in a computing device or may be implemented as part of the microcontroller that implements logic 202 (discussed above in connection with FIG. 1).

In some embodiments, the game piece 106 may need to be placed on the detection surface 104 in a consistent manner in order for the tag antennas to properly align with reader antennas in each detectable orientation. For example, the detection surface 104 may include alignment edges that includes a lip or rim against which the game piece 106 is placed for consistent alignment of the game piece 106 to the detection surface 104. In the embodiment shown in FIG. 2A, edges 208 and 210 form a first corner, where a corner of the game piece 106 fits in the corner and aligns the rest of the game piece 106 to a first position on the detection surface 104. Also in the embodiment shown, edges 212 and 214 form another corner, where a corner of the game piece 106 first in the corner and aligns the rest of the game piece 106 to a second position on the detection surface 104. Outer edges 250 and 252 of the detection surface 104 may also include a lip or rim. Other embodiments may implement additional or fewer edges for consistent placement, depending on the shape of the game piece 106. In still other embodiments, these alignment edges may not be needed for proper orientation detection of the game piece 106.

An example game piece 106 used with RFID reader 102 is shown in FIG. 2B, which shows a front side 106F of the game piece, and FIG. 2C, which shows a back side 106B of the game piece. Game piece 106 has an N number of major surfaces, N being an integer greater than 1. In the embodiment shown, game piece 106 has two (N=2) major surfaces, which may be a playing card (e.g., a poker card), an action card (e.g., text on at least one side), a two-sided token, a coin, and the like. In other embodiments, N may be 3 or greater, such as a dice (e.g., N=6 or greater), a multi-sided token (e.g., N=3 or higher), and the like.

The game piece 106 includes one or more tag antennas, shown as tag antennas B1 and B2, which are coupled to a single RFID chip 108, although additional RFID chips 108 may be implemented in other embodiments. The tag antennas may be located on one or more surfaces of the game piece 106, or may be located at least near one or more surfaces of the game piece 106 (e.g., the tag antennas are located inside of the game piece 106) such that the tag antennas still fall within the interrogation zone of a reader antenna when the game piece 106 is placed on the detection surface 104 for sufficient coupling between the tag antenna and the reader antenna. In the embodiment shown, game piece 106 has four edges, where edges 232 and 236 (shown as left and right edges) that are longer than edges 230 and 234 (shown as top and bottom edges), which may also be referred to herein as long edges 232 and 236 and short edges 230 and 234. In other embodiments, game piece 106 may have additional or fewer edges, which may have different lengths or the same lengths.

For reference's sake, edge 230 is referred to as a "leading" edge of the game piece 106 in order to describe orientation of the game piece 106 herein, although any of the edges of the game piece 106 may be used as a reference point to describe orientation. Also, the edges of the game piece 106 may be described as being in a "top" position, "bottom" position, "left" position, or "right" position (relative to the drawing page) to assist in describing orientation of the game piece 106 as the piece is rotated. The game piece 106 may be described as being oriented in a "vertical" direction (e.g., a direction parallel with the y-axis on the drawing page) when leading edge 230 is either in the "top" or "bottom" position, or may be described as being oriented in a "horizontal" direction (e.g., a direction parallel with the x-axis on the page) when leading edge 230 is either in the "left" or "right" position. In other embodiments, game piece 106 may be capable of being oriented in additional or fewer directions (e.g., oriented in one or more "diagonal" directions that are offset or rotated from the vertical or horizontal direction by some angle, such as 45 degrees), depending on the design of the geometrical arrangements of the tag antennas and reader antennas. A similarly oriented x-y plane is used for reference's sake in the remaining figures.

Also, the game piece 106 may be referred to as being in a "face-up" orientation when the front side 106F of the game piece 106 is visible to a user (e.g., the back side 106B of the game piece 106 is placed on the detection surface 104). Similarly, the game piece 106 may be referred to as being in a "face-down" orientation when the back side 106B is visible to a user (e.g., the front side 106F of the game piece 106 is placed on the detection surface 104). For a game piece 106 having an N number of major surfaces greater than N=1, each surface visible to the user may be in a respective Nth face-up orientation. In this manner, FIG. 2B may be characterized as showing the game piece 106 in a face-up vertical orientation with leading edge 230 at the top position. Similarly, FIG. 2C may be characterized as showing the game piece 106 in a face-down vertical orientation with leading edge 230 at the top position.

Tag antennas are located at separate and distinct positions on or within game piece 106. For example, in FIG. 2B, tag antenna B1 is located in a top left quadrant of the game piece 106, and tag antenna B2 is located in a bottom right quadrant of the game piece 106, where the quadrants are roughly indicated by dashed lines along the vertical (e.g., y-axis) and horizontal (e.g., x-axis) midlines of the game piece 106. In some embodiments, the locations of the tag antennas are mirrored across the horizontal and vertical midlines of the game piece 106. In the embodiment shown, a center point of both tag antenna B1 and B2 may be spaced apart from the horizontal midline by distance 220, and spaced apart from the vertical midline by distance 222. In a similar manner, the center point of both tag antenna B1 and B2 may also be spaced apart from a respective short edge 230 or 234 by a distance 224, and spaced apart from a respective long edge 232 or 236 by a distance 226. In some embodiments, the locations of the tag antennas on the game piece 106 may be described as having M-fold rotational symmetry, M being an integer greater than 1, where the locations of the tag antennas are seen in a same or similar location even as the game piece 106 is rotated. In the embodiment shown, the tag antennas have 2-fold (M=2) rotational symmetry, where rotating the game piece 106 by 180 degrees results in the tag antennas being similarly located. For example, a 180 degree rotation of the game piece 106 shown in FIG. 2B (e.g., leading edge 230 would be at the bottom position) results in tag antenna B2 being located in the top left quadrant and tag antenna B1 being located in the bottom right quadrant.

While a two-dimensional geometric arrangement of the tag antennas is shown (e.g., the tag antennas are located laterally from one another in the x-y plane), three-dimensional geometric arrangements of the tag antennas may be used in other embodiments (e.g., the tag antennas may be located on different planes within the game piece 106). Similarly, a two-dimensional geometric arrangement of the reader antennas is shown (e.g., the reader antennas are located laterally from one another in the x-y plane), three-dimensional geometric arrangements of the reader antennas may be used in other embodiments (e.g., the reader antennas may be located on different planes within the game piece 106, and may even overlap somewhat).

The geometric arrangement of the tag antenna locations on the game piece 106 may also be reflected in the geometric arrangement of the reader antenna locations on or within the detection surface 104. In some embodiments, detection surface 104 mimics the shape of the game piece 106. In the embodiment shown in FIG. 2A, alignment edges 208 and 214 have dimensions similar to short edges 230 and 234, and outer edges 250 and 252 have dimensions similar to long edges 232 and 236. Also in the embodiment shown, the center points of reader antennas A1, A2, A3, and A4 may be spaced apart from the respective "short" edge 208 or 214 by distance 224. Similarly, the center points of reader antennas A1, A2, A3, and A4 are spaced apart from a respective "long" edge 210, 212, 250 or 252 by distance 226.

FIG. 3A-3D show the various alignment patterns of one or more tag antennas to one or more reader antennas, using the RFID reader 102 shown in FIG. 2A and the game piece 106 shown in FIGS. 2B and 2C. When the game piece 106 is positioned on the detection surface 104, one of four different orientations are detectable by the RFID reader 102, based on the alignment of at least one tag antenna aligning with at least one reader antenna. In the embodiment shown, the rotationally symmetrical arrangement of tag antennas B1 and B2 allows a single reader antenna to be used to detect a respective orientation, where either tag antenna B1 or B2 aligns with one reader antenna in one of four detectable orientations, as respectively shown in FIG. 3A-3D. In other embodiments, additional orientation resolution may be provided by using one or more additional reader antennas, one or more additional tag antennas, or both, as further discussed in other embodiments below.

Figure 3C:
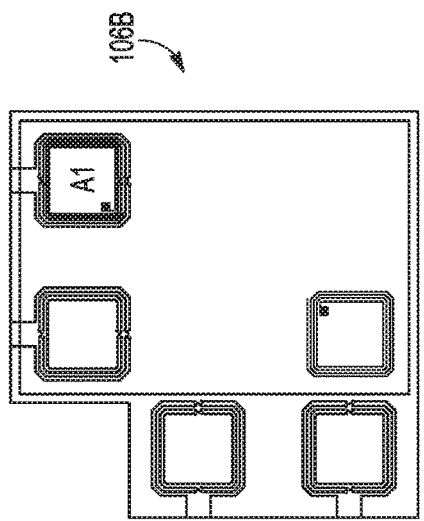
FIGS. 3A, 3B, 3C, and 3D are block diagrams depicting example game piece orientations detectable by the RFID reader of FIG. 2A according to some embodiments of the present disclosure.
Figure 3D:
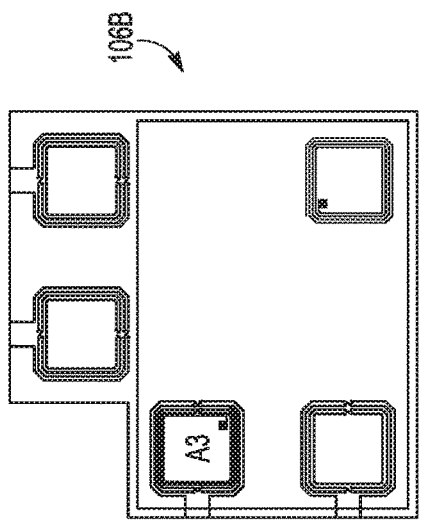
Figure 3A:
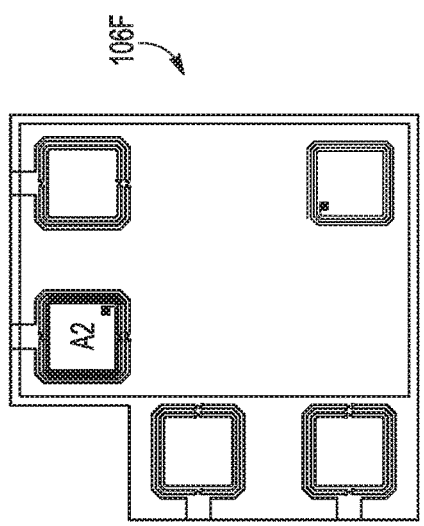

FIG. 3A shows the game piece 106 in a face-up vertical orientation (as indicated by front side 106F being visible). This orientation is detected when the game piece 106 is placed on the detection surface 104 with the leading edge 230 either in the top position (e.g., aligned against edge 208 in a position similar to that shown in FIG. 2B), which aligns tag antenna B1 with reader antenna A2, or with leading edge 230 rotated 180 degrees to the bottom position (e.g., aligned against edge 250), which aligns tag antenna B2 with reader antenna A2.

Figure 3B:
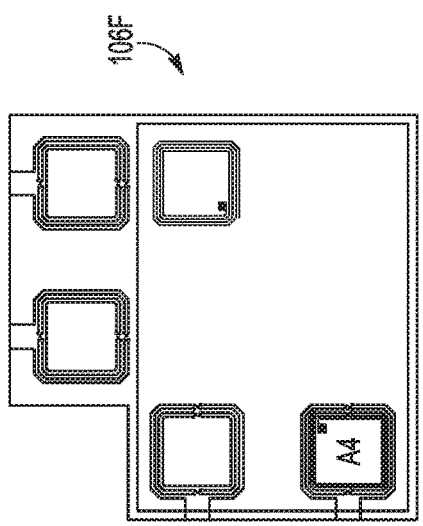

FIG. 3B shows the game piece 106 in a face-up horizontal orientation, which may be achieved by rotating the game piece 106 shown in FIG. 3A by 90 degrees to the left or to the right. This orientation is detected when the game piece 106 is placed on the detection surface 104 with leading edge 230 in the left position (e.g., aligned against edge 214), which aligns tag antenna B1 with reader antenna A4, or in the right position (e.g., aligned against edge 252), which aligns tag antenna B2 with reader antenna A4.

FIG. 3C shows the game piece 106 in a face-down vertical orientation (as indicated by back side 106B being visible). This orientation is detected when the game piece 106 is placed on the detection surface 104 with leading edge 230 either in the top position (e.g., aligned against edge 208 in a position similar to that shown in FIG. 2C), which aligns tag antenna B1 with reader antenna A1, or with leading edge 230 rotated 180 degrees to the bottom position (e.g., aligned against edge 250), which aligns tag antenna B2 with reader antenna A1.

FIG. 3D shows the game piece 106 in a face-down horizontal orientation, which may be achieved by rotating the game piece 106 shown in FIG. 3C by 90 degrees to the left or to the right. This orientation is detected when the game piece 106 is placed on the detection surface 104 with leading edge 230 in the left position (e.g., aligned against edge 214), which aligns tag antenna B1 with reader antenna A3, or in the right position (e.g., aligned against edge 252), which aligns tag antenna B2 with reader antenna A3.

The various detectable orientations of FIG. 3A-3D are summarized in Table 1 below. Each row includes a detectable orientation associated with an alignment pattern, which is the subset of detecting antennas (or reader antennas that received the response signal).

TABLE 1

Four detectable orientations

| Side Facing Up | Card Direction | Rotation | Detecting Antennas |
|---|---|---|---|
| Front | Vertical | — | A2 |
| Front | Horizontal | — | A4 |
| Back | Vertical | — | A1 |
| Back | Horizontal | — | A3 |

As indicated by Table 1, rotation is not detectable by the RFID reader 102 and game piece 106 shown in FIG. 2A-2C. For example, RFID reader 102 cannot determine whether leading edge 230 is in the top position or the bottom position when detecting the front-side-up (or face-up) vertical orientation of FIG. 3A. Another embodiment shown in FIG. 4A-4C provides additional orientation resolution.

Further, since each reader antenna receives a UID code in a received response signal, the RFID reader 102 may further be configured to detect the orientation of multiple game pieces 106 placed on the detection surface 104 simultaneously. For example, RFID reader 102 may further store each UID code received on the present reader antenna with the present counter [i] that is associated with the present reader antenna. In some embodiments, the received UID codes are stored in a buffer associated with the present reader antenna, where each reader antenna is associated with its own separate buffer. In some embodiments, each of the received UID codes are stored with an identifier of the present reader antenna (e.g., the present counter [i]) in a single tracking buffer. Once all reader antennas are checked, RFID reader 102 may compare each subset of reader antennas, grouped by associated UID code, to determine the orientation of each game piece 106 placed on the detection surface 104.

FIG. 4A is a block diagram depicting another example RFID reader 102 and FIGS. 4B and 4C are block diagrams depicting another example game piece 106. Game piece 106 of FIGS. 4B and 4C is similar to the game piece 106 shown in FIGS. 2B and 2C, with the addition of a third tag antenna B3 placed in another mirrored location on the game piece 106, such as near the corner formed by edges 230 and 236 (or may be located near the corner formed by edges 232 and 234). In the embodiment shown, a center point of tag antenna B3 may be spaced apart from the horizontal midline by distance 220, and spaced apart from the vertical midline by distance 222. In a similar manner, the center point of tag antenna B3 may also be spaced apart from short edge 230 by a distance 224, and spaced apart from long edge 236 by a distance 226. RFID reader 102 of FIG. 4A is similar to the RFID reader 102 of FIG. 2A, with the addition of a fifth reader antenna A5 placed near the corner formed by outer edges 250 and 252. The center point of reader antenna A5 may be spaced apart from edge 250 by distance 224 and may be spaced apart from edge 252 by distance 226. In the embodiment shown, distance 224 is equal to distance 226, although distance 224 may be different from distance 226 in other embodiments.

FIG. 5A-5H show the various alignment patterns of one or more tag antennas to one or more reader antennas, using the RFID reader 102 shown in FIG. 4A and the game piece 106 shown in FIGS. 4B and 4C. When the game piece 106 is positioned on the detection surface 104, one of eight different orientations are detectable by the RFID reader 102, based on the alignment of at least one tag antenna aligning with at least one reader antenna.

Figure 5A:
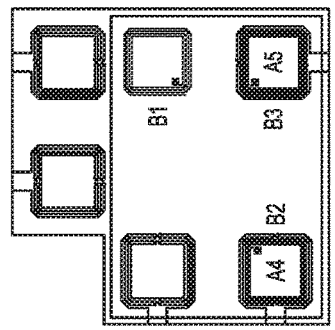
FIG. 5A-5H are block diagrams depicting example game piece orientations detectable by the RFID reader of FIG. 4A according to some embodiments of the present disclosure.

FIGS. 5A, 5B, 5C, and 5D each show the game piece 106 in a face-up orientation (as indicated by front side 106F being visible). FIG. 5A further shows the game piece 106 in a first vertical orientation with the leading edge 230 in the top position (e.g., aligned against edge 208 in a position similar to that shown in FIG. 4B), which aligns tag antenna B1 to reader antenna A2, B3 to A1, and B2 to A5.

Figure 5B:
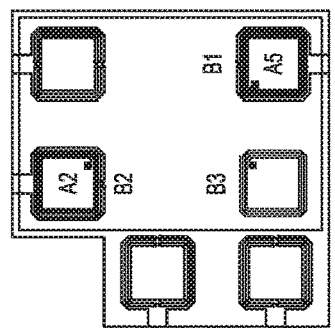

FIG. 5B further shows the game piece 106 in a first horizontal orientation, such as by rotating the game piece 106 shown in FIG. 5A to the left by 90 degrees, placing leading edge 230 in the left position (e.g., aligned against edge 214), which aligns tag antenna B1 to reader antenna A4, and B3 to A3.

Figure 5C:
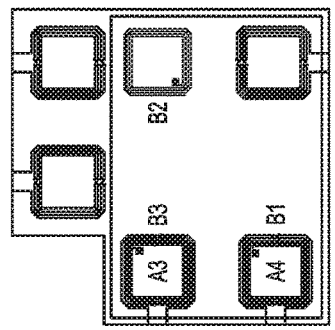

FIG. 5C further shows the game piece 106 in a second vertical orientation, such as by rotating the game piece 106 shown in FIG. 5A by 180 degrees, placing the leading edge 230 in the bottom position (e.g., aligned against edge 250), which aligns tag antenna B1 with reader antenna A5, and B2 with A2.

Figure 5D:
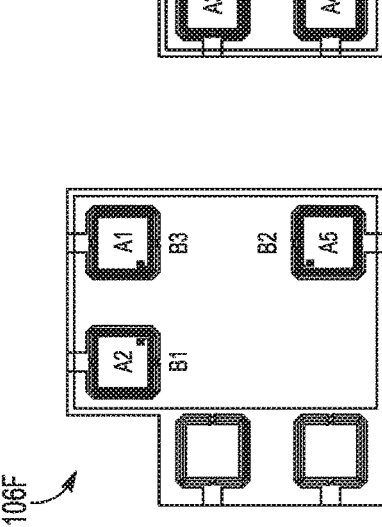

FIG. 5D further shows the game piece 106 in a second horizontal orientation, such as by rotating the game piece 106 shown in FIG. 5A to the right by 90 degrees, placing leading edge 230 in the right position (e.g., aligned against edge 252), which aligns tag antenna B2 with reader antenna A4, and B3 with A5.

Figure 5E:
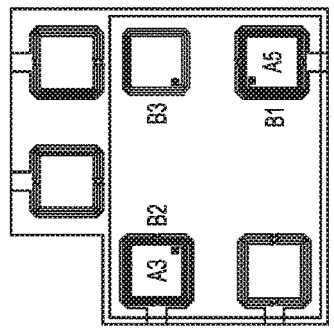

FIGS. 5E, 5F, 5G, and 5H each show the game piece 106 in a face-down orientation (as indicated by back side 106B being visible). FIG. 5E further shows the game piece 106 in a third vertical orientation with the leading edge 230 in the top position (e.g., aligned against edge 208 in a position similar to that shown in FIG. 4C), which aligns tag antenna B1 to reader antenna A1, and B3 to A2.

Figure 5F:
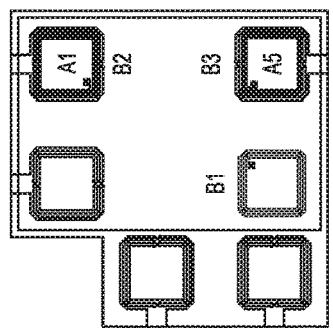

FIG. 5F further shows the game piece 106 in a third horizontal orientation, such as by rotating the game piece 106 shown in FIG. 5E to the left by 90 degrees, placing leading edge 230 in the left position (e.g., aligned against edge 214), which aligns tag antenna B1 to reader antenna A3, B3 to A4, and B2 to A5.

Figure 5G:
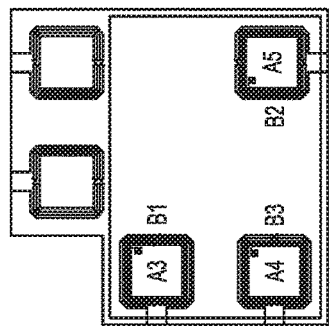

FIG. 5G further shows the game piece 106 in a fourth vertical orientation, such as by rotating the game piece 106 shown in FIG. 5E by 180 degrees, placing the leading edge 230 in the bottom position (e.g., aligned against edge 250), which aligns tag antenna B2 with reader antenna A1, and B3 with A5.

Figure 5H:
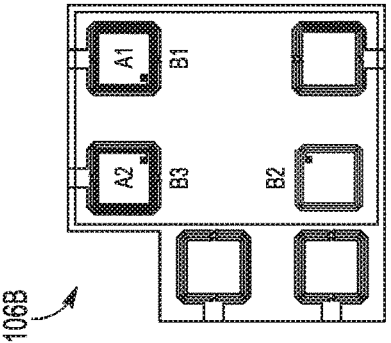

FIG. 5H further shows the game piece 106 in a fourth horizontal orientation, such as by rotating the game piece 106 shown in FIG. 5E to the right by 90 degrees, placing leading edge 230 in the right position (e.g., aligned against edge 252), which aligns tag antenna B2 with reader antenna A3, and B1 with A5.

The various detectable orientations of FIG. 5A-5D are summarized in Table 2 below:

TABLE 2

Eight detectable orientations

| Side Facing Up | Card Direction | Rotation | Detecting Antennas |
| --- | --- | --- | --- |
| Front | Vertical | Up | A1, A2, A5 |
| Front | Horizontal | Left | A3, A4 |
| Front | Vertical | Down | A2, A5 |
| Front | Horizontal | Right | A4, A5 |
| Back | Vertical | Up | A1, A2 |
| Back | Horizontal | Left | A3, A4, A5 |
| Back | Vertical | Down | A1, A5 |
| Back | Horizontal | Right | A3, A5 |

FIG. 6A is a block diagram depicting another example RFID reader 102 and FIGS. 6B and 6C are block diagrams depicting another example game piece 106. Game piece 106 of FIGS. 6B and 6C is similar to the game piece 106 shown in FIGS. 2B and 2C, with the exception that only one tag antenna B1 is used. In the embodiment shown, tag antenna B1 of FIG. 6B is placed in the top left quadrant in a similar location as that shown in FIG. 2B, where a center point of B2 is spaced from the horizontal and vertical midlines by respective distances 220 and 222, and spaced from short edge 230 and long edge 232 by respective distances 224 and 226. Tag antenna B1 may be placed in any of the mirrored locations in the other quadrants of the game piece 106 having similar spacing distances 220, 222, 224, and 226 in other embodiments, or in completely different locations in still other embodiments.

FIGS. 6D and 6E also show another example game piece 106 similar to that shown in FIGS. 6B and 6C, with the exception that the game piece 106 has longer edges 230 and 234 in FIGS. 6D and 6E than in FIGS. 6B and 6C. In the embodiment shown, edges 230, 232, 234, and 236 are of equal length, although these edges may have different lengths in other embodiments. A center point of tag antenna B1 is spaced from the horizontal midline by distance 240 and spaced from the vertical midline by distance 242. In the embodiment shown, distances 240 and 242 are equal to respective distances 220 and 222, although distances 240 and 242 may have different values in other embodiments. Since edges 230 and 234 are longer in FIG. 6D, the center point of tag antenna B1 is spaced from edge 232 by distance 246, which is larger than distance 226 in FIG. 6B. The center point of tag antenna B1 is also spaced from edge 230 by distance 244, which may be equal to or different from distance 224 in FIG. 6B, depending on the length of edges 232 and 236. Tag antenna B1 may be placed in any of the mirrored location in the other quadrants of the game piece 106 having similar spacing distances 240, 242, 244, and 246 in other embodiments, or in completely different locations in still other embodiments.

RFID reader 102 of FIG. 6A is similar to the RFID reader 102 of FIG. 2A, with the addition of reader antennas A5, A6, A7 and A8. In the embodiment shown, reader antennas A1-A8 are located around the edges of the detection surface 104, positioned in locations that correspond to where the tag antenna B1 (for either game piece shown in FIGS. 6B and 6C, or in FIGS. 6D and 6E) is expected to be located when the game piece 106 is placed on the detection surface in a particular orientation. A pair of reader antennas are located on each edge of the detection surface 104 in order to detect rotation of the game piece 106 and detect the side of the game piece 106 that is face-up. In the embodiment shown, the center point of each reader antenna is spaced away from a respective first edge of the detection surface 104 by distance 224, and from a respective perpendicular second edge by distance 226. Such an embodiment is suitable for detecting orientations of the game piece 106 shown in FIGS. 6D and 6E, which has equilateral sides. In embodiments suitable for detecting orientations of the game piece 106 shown in FIGS. 6B and 6C, the detection surface 104 may optionally include alignment edges 208, 210, 212, and 214 to properly align the game piece 106 with the detection surface 104.

In other embodiments, physical alignment features may be used. For example, one or more notches or recesses in the detection surface 104, and one or more bumps or outcroppings in a surface of the game piece 106 that physically aligns the game piece 106 to the detection surface 104. In some embodiments, these alignment features may be located near the center of the game piece 106 and the detection surface 104, as indicated by the dashed crossed lines.

The various detectable orientations detectable by the RFID reader in FIG. 6A are summarized in Table 3 below:

TABLE 3

Eight detectable orientations

| Side Facing Up | Card Direction | Rotation | Detecting Antennas |
| --- | --- | --- | --- |
| Front | Vertical | Up | A2 |
| Front | Horizontal | Left | A4 |
| Front | Vertical | Down | A6 |
| Front | Horizontal | Right | A8 |
| Back | Vertical | Up | A1 |
| Back | Horizontal | Left | A3 |
| Back | Vertical | Down | A5 |
| Back | Horizontal | Right | A7 |

It is noted that while fewer tag antennas are implemented in the game pieces of FIG. 6B-6E, the RFID reader 102 of FIG. 6A requires additional reader antennas to detect a similar number of orientations, as compared with the embodiment shown in FIG. 4A-4C. However, it may be more cost effective to implement a small number of reader antennas in the RFID reader 102 than to implement one or more tag antennas in every game piece 106 used in the RFID system 100. It is also noted that in embodiments where the game piece 106 has multiple surfaces, at least four orientations may be determined for that surface (e.g., up, left, down, right), and additional orientations (e.g., diagonal orientations rotated by some angle, such as 45 degrees, between the up, left, down, and right orientations) may be determined depending on the number of reader antennas utilized, the geometric arrangement of the reader antennas, or both.

Additionally, while the reader antennas A1-A8 are shown arranged in a three-dimensional geometric arrangement with some overlap of neighboring reader antennas (e.g., reader antenna pairs A2 and A3, A4 and A5, A6 and A7, and A8 and A1), the reader antennas may also be arranged in a two-dimensional geometric arrangement with no overlap of neighboring reader antennas. The tag antennas need not be strictly aligned with each reader antennas, but should fall substantially within an interrogation zone to achieve sufficient magnetic coupling for successful exchange of interrogation and response signals.

Finally, while the reader antennas are described as being spaced apart from edges of the detection surface 104, the geometric arrangement of the reader antennas may be described as a set of spatial relationships between the reader antennas, where each reader antenna is spaced apart from its neighboring reader antennas by some specified distance. This set of spatial relationships may reflect or mimic the spatial relationships between the tag antennas, where each tag antenna is similarly spaced apart from its neighboring tag antennas (e.g., all tag antennas on the game piece 106 or a subset of tag antennas on a surface of the game piece 106) by similar distances.

Figure 7:
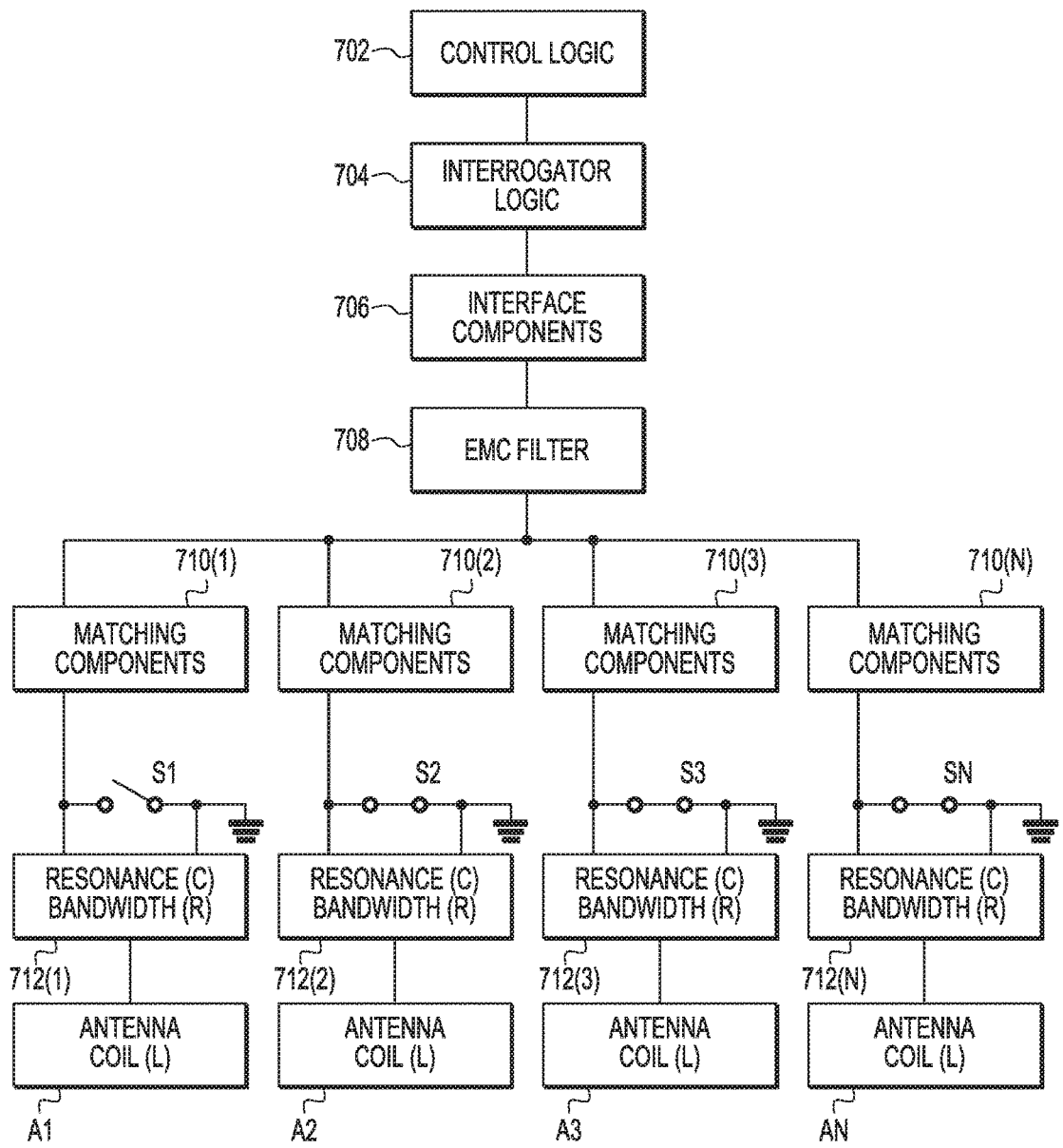
FIGS. 7 and 8 are block diagrams depicting example components of an RFID reader according to some embodiments of the present disclosure.

FIG. 7 shows a high-level connectivity diagram depicting example components of an RFID reader 102. As shown, RFID reader 102 includes control logic 702 (e.g., logic 202) that implements the orientation detection algorithm. Control logic 702 is communicatively coupled to interrogator logic 704 (e.g., interrogator 204) that implements sending and receiving RF signals. Interrogator logic 704 is bidirectionally coupled to one or more interface components 706 for carrying an interrogator signal or a response signal, which may be implemented by a transmission line (T-line), cable, or similar signal conveyance. Interface components 706 are coupled to EMC (electromagnetic compatibility) filter 708 that ensures signals having the proper frequencies are received, reducing electromagnetic interference from unwanted sources. EMC filter 708 is coupled to an N number of antenna circuit branches, where each branch includes matching components 710, an enable switch S, a resonance and bandwidth circuit 712 (shown as having capacitance C and resistance R), and an antenna coil (shown as having impedance L). Control logic 702 also provides switch control signals to the enable switches S1-SN.

The switch control signals are each configured to open or close the respective switch to enable or disable the respective reader antenna. For example, an activated control signal may close the switch by making it conductive and complete the path between the first and second terminals of the switch, which shorts and disables the coupled reader antenna. A deactivated control signal may open the switch by making the switch nonconductive and break the path between the first and second terminals of the switch, which enables the coupled reader antenna. In the embodiments discussed herein, only one antenna is activated at a time, where FIG. 7 shows switch S1 being open and reader antenna A1 being enabled, while the remaining reader antennas A2-AN are concurrently deactivated by switches S2-SN being closed and shorting the antennas A2-AN. Such a one-at-a-time scheme for enabling the reader antennas reduces any cross-coupling effects.

The switches S1-SN may be implemented using relays, MOSFETs (metal-oxide-semiconductor field-effect-transistors), BJTs (bipolar junction transistors), depending on the requirements of the RFID system 100, such as energy or power requirements, highest voltage on the resonance circuit, as well as economic reasons as the number of switches implemented, the space available, and the like.

The sensitivity of the reader antennas (e.g., size of an interrogation zone around the reader antennas) may be tuned based on the resonance and bandwidth circuit 712. Capacitance and resistive values C and R may be selected to tune the resonance frequency of each reader antenna to a desired operating frequency. Similarly, the tag antennas may tuned based on a resonance and bandwidth circuit included in the RFID chip 108. For comparison's sake, a higher frequency (close to the operating frequency of the reader) may be selected if the reader antennas are spaced closely to one another and a "tighter" interrogation zone is desired, while a lower frequency (close to the operating frequency of the reader) may be selected if the reader antennas are spaced farther apart from one another and a "looser" interrogation zone is desired.

Figure 8:
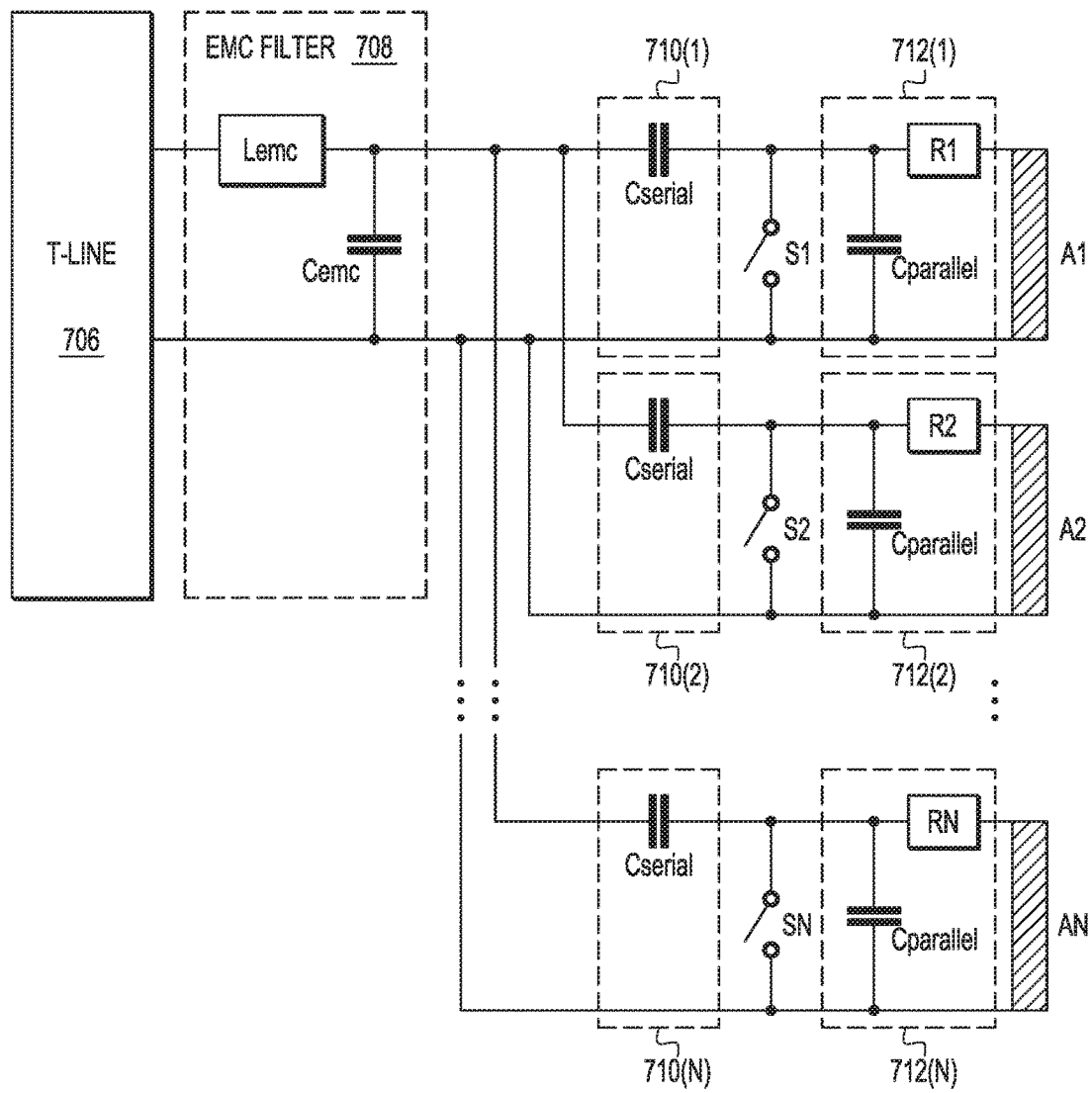

FIG. 8 shows an example circuit schematic of the components of the RFID reader 102. Transmission line 706 is connected to EMC filter 708 that is implemented as an LC-filter having an impedance Lemc and a capacitance Cemc, which implements a cutoff frequency for a low pass filter (e.g., to pass received RF signals within a desired frequency band defined by the cutoff frequency to the transmission line 706). EMC filter 708 may also provide some impedance matching between the output of the transmission line 706 and the load impedance of the antenna circuit branches.

EMC filter 708 is coupled to each antenna A1-AN by an antenna circuit branch that includes matching components 710, which may include one or more capacitors, resistors, and inductors for impedance matching (e.g., matching the load impedance of the antenna to the EMC filter 708). In the embodiment shown, matching components 710 is implement as a serial capacitance Cserial. The matching components 710 of a branch are coupled to a first electrode of a respective switch S, which has a second electrode coupled to ground, and a control electrode coupled to a control signal received from control logic 702. The switch S is further coupled to resonance and bandwidth circuit 712, which is implemented as an RC-circuit that includes a resistance R and a parallel capacitance Cparallel. The resonance and bandwidth circuit 712 is coupled to the antenna A. Resonance and bandwidth circuit 712 implements a resonance frequency of the antenna, and values of resistance R and capacitance Cparallel may be selected to implement a desired operating frequency as the resonance frequency of the antenna A.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description refers to nodes or features being "connected" or "coupled" together. As used herein, unless expressly stated otherwise, "coupled" means that one node or feature is directly or indirectly joined to (or is in direct or indirect communication with) another node or feature, and not necessarily physically. As used herein, unless expressly stated otherwise, "connected" means that one node or feature is directly joined to (or is in direct communication with) another node of feature. For example, a switch may be "coupled to a plurality of nodes, but all of those nodes need not always be "connected" to each other; the switch may connect different nodes to each other depending upon the state of the switch. Furthermore, although the various schematics shown herein depict certain example arrangements of elements, additional intervening elements, devices, features, or components may be present in an actual embodiment (assuming that the functionality of the given circuit is not adversely affected). As used herein, "magnetically coupled" indicates a wireless connection to directly join a pair of components, while "coupled" used alone generally means "electrically coupled," which indicates a wired connection to directly or indirectly join a pair of components.

The circuitry described herein (e.g., RFID chip 108, logic functionality 202 and interrogator functionality 204 of RFID reader 102, RF front-end blocks of RFID chip 108 and RFID reader 102, DSP block of RFID reader 102) may be implemented using any semiconductor material or combinations of materials, such as gallium arsenide, silicon germanium, silicon-on-insulator (SOI), silicon, monocrystalline silicon, the like, and combinations of the above.

In one embodiment, the illustrated elements of RFID reader 102 (e.g., in FIGS. 2A, 4A, and 6A) are circuitry located on a single integrated circuit or within a same device. In other embodiments, RFID reader 102 may include any number of separate integrated circuits or separate devices interconnected with each other. For example, logic functionality 202 may be located on a same integrated circuit that is separate from an integrated circuit that includes interrogator functionality 204, both of which may be attached to a single substrate or printed circuit board (PCB) as part of a single device.

By now it should be appreciated that there has been provided an RFID system that includes an RFID reader coupled to a plurality of antennas arranged in a geometric arrangement on or within a detection surface, where the RFID reader is configured to detect an orientation of one or more game pieces placed on the detection surface, where each game piece includes one or more tag antennas.

In one embodiment of the present disclosure, a radio frequency identification (RFID) reader is provided, which includes: an RFID interrogator; a detection surface for a game piece, the detection surface including a plurality of reader antennas in a geometric arrangement; and antenna switching circuitry coupled between the RFID interrogator and the plurality of reader antennas; wherein the antenna switching circuitry is configured to consecutively activate each one of the plurality of reader antennas for at least a detection time window, and wherein the RFID interrogator is configured to: for each reader antenna, detect whether a response signal is received by the reader antenna during the detection time window, and determine a geometric orientation of the game piece based on a subset of reader antennas that received the response signal.

One aspect of the above embodiment provides that the geometric orientation is one of a plurality of geometric orientations detectable by the RFID reader, and each geometric orientation is associated with a different subset of reader antennas that received the response signal.

Another aspect of the above embodiment provides that the RFID interrogator is configured to: transmit an interrogation signal on a present reader antenna and, during a present detection time window, detect whether a response signal is received on the present reader antenna, after the present detection time window has expired, transmit another interrogation signal on a next reader antenna, and during a next detection time window, detect whether a response signal is received on the next reader antenna.

Another aspect of the above embodiment provides that the antenna switching circuitry further includes: a plurality of switches, wherein a respective switch is coupled to each reader antenna, wherein the respective switch is configured to either activate or deactivate its respective reader antenna.

A further aspect of the above embodiment provides that the RFID reader further includes: an RFID controller coupled to the RFID interrogator and to the antenna switching circuitry, the RFID controller configured to: control the plurality of switches to activate one reader antenna of the plurality of reader antenna, subsequent to activation of the one reader antenna, control the RFID interrogator to transmit an interrogation signal on the one reader antenna, and subsequent to transmission of the interrogation signal, control the plurality of switches to deactivate the one reader antenna after the detection time window has expired.

A still further aspect of the above embodiment provides that the RFID controller is further configured to: in response to receipt of a response signal on the one reader antenna during the detection time window, store an asserted receipt indicator in a receipt indicator buffer associated with the one reader antenna.

A yet still further aspect of the above embodiment provides that the receipt indicator buffer is one of a plurality of receipt indicator buffers, each receipt indicator buffer is associated with a respective reader antenna, and the asserted receipt indicator is stored in the receipt indicator buffer associated with the one reader antenna.

Another yet still further aspect of the above embodiment provides that the receipt indicator buffer is associated with all of the reader antennas, and the asserted receipt indicator is stored with an identification of the one reader antenna in the receipt indicator buffer.

Another yet still further aspect of the above embodiment provides that the RFID controller is further configured to: after all reader antennas have been consecutively activated for the detection time window, compare all asserted receipt indicators of the subset of reader antennas that received the interrogation signal with predetermined patterns of asserted receipt indicators, wherein each predetermined pattern indicates a different geometric orientation of the game piece.

Another yet still further aspect of the above embodiment provides that the response signal includes a unique identification (UID) code, and the RFID controller is further configured to store the UID code with the asserted receipt indicator.

Another yet still further aspect of the above embodiment provides that the RFID controller is further configured to: in response to receipt of a second response signal on the one reader antenna during the detection time window, store a second UID code included in the second response signal with the asserted receipt indicator, and after all reader antennas have been consecutively activated for the detection time window, compare all asserted receipt indicators grouped by UID code with predetermined patterns of asserted receipt indicators, wherein each predetermined pattern indicates a different geometric orientation of the game piece.

In another embodiment of the present disclosure, an RFID (radio frequency identification) system is provided, which includes: an RFID reader including: a detection surface including a reader geometric arrangement of a plurality of reader antennas; and antenna switching circuitry coupled to the plurality of reader antennas, the antenna switching circuitry configured to consecutively activate each one of the plurality of reader antennas for at least a detection time window; and a game piece including a tag geometric arrangement of one or more tag antennas; wherein the RFID reader is configured to detect a geometric orientation of the game piece based on an alignment pattern of the tag geometric arrangement to the reader geometric arrangement.

One aspect of the above embodiment provides that the alignment pattern includes at least one tag antenna in the tag geometric arrangement magnetically coupled to a respective reader antenna in the reader geometric arrangement.

Another aspect of the above embodiment provides that the geometric orientation is one of a plurality of geometric orientations of the game piece detectable by the RF reader, and each geometric orientation is associated with a different alignment pattern.

Another aspect of the above embodiment provides that the one or more tag antennas are arranged on the game piece in a rotationally symmetrical manner.

Another aspect of the above embodiment provides that the RFID reader is further configured to, for each reader antenna according to a consecutive order: activate a present reader antenna, transmit an interrogation signal on the present reader antenna, in response to receipt of a response signal on the present reader antenna during a present detection time window, store an asserted receipt indicator associated with the present reader antenna, and deactivate the present reader antenna when the present detection time window has expired.

A further aspect of the above embodiment provides that the RFID reader is further configured to: after consecutive activation of each of the plurality of reader antennas is complete, determine the alignment pattern from a set of asserted receipt indicators that indicate which tag antennas are magnetically coupled to a respective reader antenna.

Another aspect of the above embodiment provides that the game piece further includes an RFID integrated circuit (IC) electrically coupled to the one or more tag antennas, wherein the RFID IC is configured to transmit a response signal on each of the one or more tag antennas.

A further aspect of the above embodiment provides that the RFID reader is configured to detect a geometric orientation for each of a plurality of game pieces simultaneously placed on the detection surface, wherein each RFID IC of a respective game piece is configured to transmit a unique identification (UID) code that identifies the respective game piece, the RFID reader is configured to determine an alignment pattern for each game piece based on a respective subset of reader antennas grouped by UID code.

Another aspect of the above embodiment provides that the game piece has an N number of surfaces, N being an integer of two or greater, and the RFID reader is configured to detect for each Nth surface of the game piece: an Nth face-up orientation with the game piece rotated in a top position, an Nth face-up orientation with the game piece rotated in a left position, an Nth face-up orientation with the game piece rotated in a bottom position, and an Nth face-up orientation with the game piece rotated in a right position.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

As used herein, the terms "substantial" and "substantially" mean sufficient to achieve the stated purpose or value in a practical manner, taking into account any minor imperfections or deviations, if any, that arise from usual and expected abnormalities that may occur during operation, which are not significant for the stated purpose or value.

Although the invention is described herein with reference to specific embodiments, various modifications and changes can be made without departing from the scope of the present invention as set forth in the claims below. For example, additional or fewer reader antennas may be implemented in FIG. 2A. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A radio frequency identification (RFID) reader comprising:
   an RFID interrogator;
   a detection surface for a game piece, the detection surface comprising a plurality of reader antennas in a geometric arrangement; and
   antenna switching circuitry coupled between the RFID interrogator and the plurality of reader antennas;
   wherein the antenna switching circuitry is configured to consecutively activate each one of the plurality of reader antennas for at least a detection time window, and
   wherein the RFID interrogator is configured to:
      transmit an interrogation signal on a present reader antenna and,
      during a present detection time window, detect whether a response signal is received on the present reader antenna,
      after the present detection time window has expired, transmit another interrogation signal on a next reader antenna,
      during a next detection time window, detect whether a response signal is received on the next reader antenna, and
      determine a geometric orientation of the game piece based on a subset of reader antennas that received the response signal.

2. The RFID reader of claim 1, wherein
   the geometric orientation is one of a plurality of geometric orientations detectable by the RFID reader, and
   each geometric orientation is associated with a different subset of reader antennas that received the response signal.

3. The RFID reader of claim 1, wherein
   the antenna switching circuitry further comprises:
      a plurality of switches, wherein a respective switch is coupled to each reader antenna, wherein the respective switch is configured to either activate or deactivate the reader antenna coupled to the respective switch.

4. The RFID reader of claim 3, further comprising:
   an RFID controller coupled to the RFID interrogator and to the antenna switching circuitry, the RFID controller configured to:
      control the plurality of switches to activate one reader antenna of the plurality of reader antenna,
      subsequent to activation of the one reader antenna, control the RFID interrogator to transmit an interrogation signal on the one reader antenna, and
      subsequent to transmission of the interrogation signal, control the plurality of switches to deactivate the one reader antenna after the detection time window has expired.

5. The RFID reader of claim 4, wherein
   the RFID controller is further configured to:
      in response to receipt of a response signal on the one reader antenna during the detection time window, store an asserted receipt indicator in a receipt indicator buffer associated with the one reader antenna.

6. The RFID reader of claim 5, wherein
   the receipt indicator buffer is one of a plurality of receipt indicator buffers,
   each receipt indicator buffer is associated with a respective reader antenna, and
   the asserted receipt indicator is stored in the receipt indicator buffer associated with the one reader antenna.

7. The RFID reader of claim 5, wherein
   the receipt indicator buffer is associated with all of the reader antennas, and
   the asserted receipt indicator is stored with an identification of the one reader antenna in the receipt indicator buffer.

8. The RFID reader of claim 7, wherein
   the RFID controller is further configured to:
      in response to receipt of a second response signal on the one reader antenna during the detection time window, store a second UID code included in the second response signal with the asserted receipt indicator, and
      after all reader antennas have been consecutively activated for the detection time window, compare all asserted receipt indicators grouped by UID code with predetermined patterns of asserted receipt indicators, wherein each predetermined pattern indicates a different geometric orientation of the game piece.

9. The RFID reader of claim 5, wherein
   the RFID controller is further configured to:
      after all reader antennas have been consecutively activated for the detection time window, compare all asserted receipt indicators of the subset of reader antennas that received the interrogation signal with predetermined patterns of asserted receipt indicators, wherein each predetermined pattern indicates a different geometric orientation of the game piece.

10. The RFID reader of claim 5, wherein
    the response signal includes a unique identification (UID) code, and
    the RFID controller is further configured to store the UID code with the asserted receipt indicator.

11. An RFID (radio frequency identification) system comprising:
    an RFID reader comprising:
       a detection surface comprising a reader geometric arrangement of a plurality of reader antennas; and
       antenna switching circuitry coupled to the plurality of reader antennas, the antenna switching circuitry configured to consecutively activate each one of the plurality of reader antennas for at least a detection time window; and a game piece comprising a tag geometric arrangement of one or more tag antennas;

wherein the RFID reader is configured to:
  for each reader antenna according to a consecutive order:
    activate a present reader antenna,
    transmit an interrogation signal on the present reader antenna,
    in response to receipt of a response signal on the present reader antenna during a present detection time window, store an asserted receipt indicator associated with the present reader antenna, and
    deactivate the present reader antenna when the present detection time window has expired; and
  detect a geometric orientation of the game piece based on an alignment pattern of the tag geometric arrangement to the reader geometric arrangement based on a subset of reader antennas that received the response signal.

12. The RFID system of claim 11, wherein the alignment pattern comprises at least one tag antenna in the tag geometric arrangement magnetically coupled to a respective reader antenna in the reader geometric arrangement.

13. The RFID system of claim 11, wherein the geometric orientation is one of a plurality of geometric orientations of the game piece detectable by the RF reader, and each geometric orientation is associated with a different alignment pattern.

14. The RFID system of claim 11, wherein the one or more tag antennas are arranged on the game piece in a rotationally symmetrical manner.

15. The RFID system of claim 11, wherein the RFID reader is further configured to:
  after consecutive activation of each of the plurality of reader antennas is complete, determine the alignment pattern from a set of asserted receipt indicators that indicate which tag antennas are magnetically coupled to a respective reader antenna.

16. The RFID system of claim 11, wherein the game piece further comprises an RFID integrated circuit (IC) electrically coupled to the one or more tag antennas, wherein the RFID IC is configured to transmit a response signal on each of the one or more tag antennas.

17. The RFID system of claim 16, wherein the RFID reader is configured to detect a geometric orientation for each of a plurality of game pieces simultaneously placed on the detection surface, wherein
  each RFID IC of a respective game piece is configured to transmit a unique identification (UID) code that identifies the respective game piece,
  the RFID reader is configured to determine an alignment pattern for each game piece based on a respective subset of reader antennas grouped by UID code.

18. The RFID system of claim 11, wherein the game piece has an N number of surfaces, N being an integer of two or greater, and
the RFID reader is configured to detect for each Nth surface of the game piece:
  an Nth face-up orientation with the game piece rotated in a top position,
  an Nth face-up orientation with the game piece rotated in a left position,
  an Nth face-up orientation with the game piece rotated in a bottom position, and
  an Nth face-up orientation with the game piece rotated in a right position.

\* \* \* \* \*